(12) United States Patent
Maes

(10) Patent No.: US 8,196,125 B2
(45) Date of Patent: Jun. 5, 2012

(54) OPTIMIZATION OF POLICY ENFORCEMENT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1504 days.

(21) Appl. No.: 11/677,281

(22) Filed: Feb. 21, 2007

(65) Prior Publication Data

US 2008/0201179 A1    Aug. 21, 2008

(51) Int. Cl.
*G06F 9/44* (2006.01)
*G06F 9/45* (2006.01)
(52) U.S. Cl. .................. 717/151; 717/120; 717/154
(58) Field of Classification Search .................. None
See application file for complete search history.

(56) References Cited

U.S. PATENT DOCUMENTS 6,879,926 B2 *    4/2005    Schmit et al. .................. 702/123

* cited by examiner

*Primary Examiner* — Chuck Kendall
(74) *Attorney, Agent, or Firm* — Kilpatrick Townsend & Stockton LLP

(57) ABSTRACT

Methods, systems, and machine-readable media are disclosed for improving the efficiency of policy enforcement. According to one embodiment, a method for improving efficiency during enforcement of a policy can comprise determining a topology for the policy. A plurality of equivalent topologies for the policy can then be determined. A cost function can be applied to each of the plurality of equivalent topologies and one of the plurality of equivalent topologies can be selected based on the cost function.

45 Claims, 10 Drawing Sheets

OPTIMIZATION OF POLICY ENFORCEMENT

BACKGROUND OF THE INVENTION

Embodiments of the present invention generally relate to policy enforcement. More specifically, embodiments of the present invention relate to optimization of policies enforced on communications and/or requests for resources.

A policy can generally be defined as any combination of rules where each rule is a combination of one or more conditions and one or more actions to be performed upon satisfaction of the associated condition. Policies can be applied in numerous different contexts to achieve a wide variety of outcomes or effects. For example, one or more policies or sets of policies can be applied to electronic communications of different types to affect the routing or other handling of the communication.

In general policies are set and used to determine the terms under which a resource is used or a task is performed. Policies can be set to determine any of a number of aspects of various applications including but not limited to messaging or collaboration. For example, a policy can be used for access control (AAA), charging or billing, defining a Service Level Agreement (SLA), defining quality of services, defining priorities, defining preferences, defining privacy/filtering, defining conditions of usage, logging, etc.

However, as the complexity of the policy increases, potential inefficiencies become a greater concern. That is, as the size of the policies grows in terms of the number of rules and/or conditions, the inefficiencies in terms of how the policy is defined and/or applied become more likely and/or significant. However, there is currently no way to optimize or improve the efficiency of these policies. Rather, policies are typically statically defined only to achieve the desired outcome for a particular condition or set of conditions. Hence, there is a need in the art for improved methods and systems for optimizing or improving the efficiency of policy enforcement.

BRIEF SUMMARY OF THE INVENTION

Methods, systems, and machine-readable media are disclosed for improving the efficiency of policy enforcement. According to one embodiment, a method for improving efficiency during enforcement of a policy can comprise determining a topology for the policy. A plurality of equivalent topologies for the policy can then be determined. A cost function can be applied to each of the plurality of equivalent topologies and one of the plurality of equivalent topologies can be selected based on the cost function.

For example, applying the cost function to each of the plurality of equivalent topologies can comprise determining an amount of latency in execution of each topology and selecting the one of the plurality of equivalent topologies based on the cost function can comprise selecting an equivalent topology with a least amount of latency. In another example, applying the cost function to each of the plurality of equivalent topologies can comprise determining a speed of execution for each topology and selecting the one of the plurality of equivalent topologies based on the cost function can comprise selecting an equivalent topology with a highest speed. Additionally or alternatively, applying the cost function to each of the plurality of equivalent topologies can comprise determining a CPU consumption for execution of each topology and selecting the one of the plurality of equivalent topologies based on the cost function can comprise selecting an equivalent topology with a lowest CPU consumption. In another example, applying the cost function to each of the plurality of equivalent topologies can comprise determining a level of parallelization for each topology and selecting the one of the plurality of equivalent topologies based on the cost function can comprise selecting an equivalent topology with a highest level of parallelization. In yet another example, applying the cost function to each of the plurality of equivalent topologies can comprise determining a level of parallelization for each topology and selecting the one of the plurality of equivalent topologies based on the cost function can comprise selecting an equivalent topology with a least amount of parallelization. Additionally or alternatively, applying the cost function to each of the plurality of equivalent topologies can comprise determining an amount of delegation to external tasks during execution of each topology and selecting the one of the plurality of equivalent topologies based on the cost function can comprise selecting an equivalent topology with a least amount of delegation. In another example, applying the cost function to each of the plurality of equivalent topologies can comprise determining a level of serialization for each topology and selecting the one of the plurality of equivalent topologies based on the cost function can comprise selecting an equivalent topology with a highest level of serialization. In still another example, applying the cost function to each of the plurality of equivalent topologies can comprise determining a level of serialization for each topology and selecting the one of the plurality of equivalent topologies based on the cost function can comprise selecting an equivalent topology with a least amount of serialization.

According to one embodiment, the method can further comprise storing one or more hard-coded, predetermined patterns of possible execution paths for the policy. In such a case, one or more of the hard-coded, predetermined patterns can be identified in the selected topology and the identified one or more hard-coded, predetermined patters can be pre-compiled for execution during enforcement of the policy. Furthermore, applying the cost function can comprise identifying occurrences of one or more of the hard-coded, predetermined patterns in the plurality of equivalent topologies and selecting one of the plurality of equivalent topologies based on the cost function can comprise selecting an equivalent topology with a greatest occurrence of hard-coded, predetermined patterns. According to one embodiment, portions of the selected topology not including hard-coded, predetermined patterns can be rearranged to decrease a depth of the topology and/or to increase parallelization of the topology.

Optimizing the policy based on the cost function can comprise, for example, delegating enforcement of at least a portion of the policy to optimized hardware. Additionally or alternatively, optimizing the policy based on the cost function can comprise delegating enforcement of at least a portion of the policy to an optimized execution environment. Applying the cost function to the policy and optimizing the policy based on the cost function can be performed in real time during enforcement of the policy, during authoring of the policy, during deployment of the policy, etc. The policy can comprise, for example, an Open System Architecture (OSA) orchestration, a workflow, a composer, etc.

According to another embodiment, a system can comprise a communications network and a policy data store. The policy data store can have stored therein a policy. The policy can comprise a plurality of rules, each rule comprising at least one condition and at least one action associated with each condition. The system can also include a policy enforcer communicatively coupled with the communication network and the policy data store. The policy enforcer can be adapted to apply the policy to communications on the communications network The system can also include a policy optimizer communicatively coupled with the policy data store. The policy optimizer can be adapted to determine a topology for the policy, determine a plurality of equivalent topologies for the policy, apply a cost function to each of the plurality of equivalent topologies, and select one of the plurality of equivalent topologies based on the cost function. It should be noted that this can be done at different levels such as when authoring the policy (i.e. while authoring or after authoring), when storing, before processing the policy or when the policy is being processed, i.e., in real time.

For example, the policy optimizer can be adapted to apply the cost function to each of the plurality of equivalent topologies by determining an amount of latency in execution of each topology and select an equivalent topology with a least amount of latency. In another example, the policy optimizer can be adapted to apply the cost function to each of the plurality of equivalent topologies by determining a speed of execution for each topology and select the one of the plurality of equivalent topologies with a highest speed. Additionally or alternatively, the policy optimizer can be adapted to apply the cost function to each of the plurality of equivalent topologies by determining a CPU consumption for execution of each topology and select the one of the plurality of equivalent topologies with a lowest CPU consumption. In yet another example, the policy optimizer can be adapted to apply the cost function to each of the plurality of equivalent topologies by determining a level of parallelization for each topology and select the one of the plurality of equivalent topologies with a highest level of parallelization. Alternatively, the policy optimizer can be adapted to apply the cost function to each of the plurality of equivalent topologies by determining a level of parallelization for each topology and select an equivalent topology with a least amount of parallelization. In still another example, the policy optimizer can be adapted to apply the cost function to each of the plurality of equivalent topologies by determining an amount of delegation to external tasks during execution of each topology and select an equivalent topology with a least amount of delegation. Additionally or alternatively, the policy optimizer can be adapted to apply the cost function to each of the plurality of equivalent topologies by determining a level of serialization for each topology and select an equivalent topology with a highest level of serialization. In yet another example, the policy optimizer can be adapted to apply the cost function to each of the plurality of equivalent topologies by determining a level of serialization for each topology and select an equivalent topology with a least amount of serialization.

The policy optimizer can be further adapted to store one or more hard-coded, predetermined patterns (including hardware patterns or operations) of possible execution paths for the policy. In such a case, the policy optimizer can be further adapted to identify one or more of the hard-coded, predetermined patterns in the selected topology. The identified one or more hard-coded, predetermined patters can be precompiled for execution during enforcement of the policy. According to one embodiment, the policy optimizer can be adapted to apply the cost function by identifying occurrences of one or more of the hard-coded, predetermined patterns in the plurality of equivalent topologies (e.g. authentication, authorization, and/or charging in a particular way). In such a case, selecting one of the plurality of equivalent topologies based on the cost function comprises selecting an equivalent topology with a greatest occurrence of hard-coded, predetermined patterns. Alternatively or additionally, the policy optimizer can be further adapted to rearrange portions of the selected topology not including hard-coded, predetermined patterns to decrease a depth of the topology and/or to increase parallelization of the topology. According to one embodiment, the policy enforcer can be implemented in a web service gateway.

According to yet another embodiment, a system can comprise a policy data store having stored therein a policy. The policy can comprise a plurality of rules, each rule comprising at least one condition and at least one action associated with each condition. The system can also include a policy optimizer communicatively coupled with the policy data store. The policy optimizer can be adapted to determine a topology for the policy, determine a plurality of equivalent topologies for the policy, apply a cost function to each of the plurality of equivalent topologies, and select one of the plurality of equivalent topologies based on the cost function.

For example, the policy enforcer and/or the policy optimizer can be implemented in a web service gateway. The web service gateway can be further adapted to intercept web service exchanges and apply the policy to the exchanges. Applying the policies to the exchanges can cause the web service gateway to perform authentication and/or authorization services for users of a web service. Additionally or alternatively, applying the policies to the exchanges can cause the web service gateway to charge users for use of a web service.

DETAILED DESCRIPTION OF THE INVENTION

Figure 1:
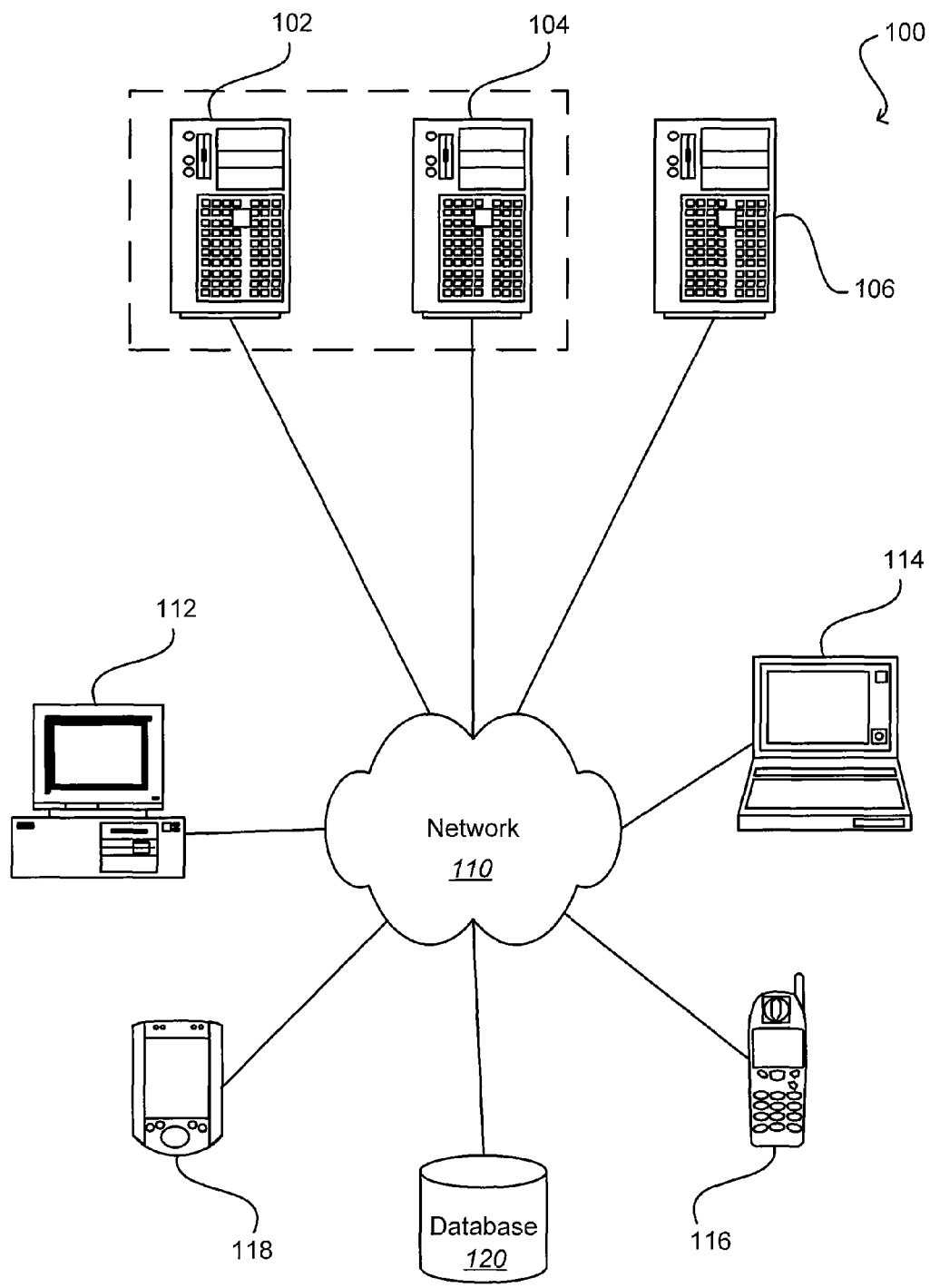
FIG. 1 is a block diagram illustrating an exemplary environment in which various embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As used herein the term policy can be defined as an ordered combination of rules, i.e., a combination of condition and action(s), that define how to administer, manage, and/or control access to resources. A policy action can be defined as an action (e.g. invocation of a function, script, code, workflow) that is associated with a policy condition in a policy rule and that is executed when its associated policy condition results in "true" from the policy evaluation step. A policy condition is a condition is any expression that yields a Boolean value.

Policy enforcement can be defined as the process of executing actions, which may be performed as a consequence of the output of the policy evaluation process or during the policy evaluation process. Policy evaluation is the process of evaluating the policy conditions and executing the associated policy actions up to the point that the end of the policy is reached. A policy can be evaluated or enforced in proxy mode, i.e. as gatekeeper to request to use a resource, or in callable mode as a delegated or callable process that can be requested. That is, in proxy mode requests for resources are intercepted and policy evaluation and enforcement can be performed based on the request. In callable mode, policy evaluation and enforcement can also be delegated. That is policy evaluation and enforcement can be called to delegate both evaluation and enforcement—e.g., call a workflow that carries processing of all conditions and actions then terminates, for example, without returning results to the requester (thread terminates or return results/events to another actor).

Policy management can be defined as the act of describing, creating, updating, deleting, provisioning and viewing policies. Policy processing comprises policy evaluation or policy evaluation and enforcement. A request is an articulation of the need to access a resource (e.g. asynchronous events). The requester is any entity that issues a request to a resource. A resource is any component, enabler, function or application that can receive and process requests.

Generally speaking, embodiments of the present invention relate to improving the efficiency of policies. Such policies can be applied, for example, to any appropriate communication and/or collaboration technology, such as may include, but are not limited to, instant messaging, e-mail, short messaging service (SMS), multimedia messaging service (MMS), voicemail, Push to Talk (PTT), Push to Talk Over Cellular (PoC), chat, voice chat, video chat, Web conferencing, push e-mail, phone/voice/multimedia calls (including multimedia SIP invites), faxing, multimedia conferencing, and any of a number of other such technologies known or used in the art. Additionally or alternatively, the policies can be applied to determine any of a number of aspects of various applications including but not limited to messaging or collaboration. For example, a policy can be used for access control (AAA), charging or billing, defining a Service Level Agreement (SLA), defining quality of services, defining priorities, defining preferences, defining privacy/filtering, defining conditions of usage, logging, etc.

As will be described in detail below, a system according to one embodiment of the present invention can comprise a policy data store having stored therein a policy. The policy can comprise a plurality of rules, each rule comprising at least one condition and at least one action associated with each condition. For example, the policy enforcer can be implemented in a web service gateway. The web service gateway can be further adapted to intercept web service exchanges and apply the policy to the exchanges. Applying the policies to the exchanges can cause the web service gateway to perform authentication and/or authorization services for users of a web service. Additionally or alternatively, applying the policies to the exchanges can cause the web service gateway to charge users for use of a web service. Furthermore, it should be noted that the policies can be applied in a proxy mode or a callable mode.

FIG. 1 is a block diagram illustrating an exemplary environment in which various embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or LNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 100 is shown with four user computers, any number of user computers may be supported.

The system 100 can also include a communications network 110. The network may can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10g, that is adapted to store, update, and retrieve data in response to SQL-formatted commands.

As will be seen, one or more of the servers 102, 104, 106 or user computers 112, 114, 116, 118 may also include a policy enforcer for applying a policy or set of policies, in the form of a set of rules, each rule comprising at least one condition with at least one associated action, to communications between the servers 102, 104, 106, between the servers 102, 104, 106 and the user computers 112, 114, 116, 118, and/or between the user computers 112, 114, 116, 118. Depending upon where and how the policy enforcer is implemented, a policy optimizer may also me implemented. As will be discussed in detail below, the policy optimizer can be adapted to improve the efficiency of the policies as defined by a cost function. That is, the cost function can define parameters by which the efficiency of the policy can be judged. The policy can then be organized or modified in a manner to improve the efficiency of the implemented policy in terms of this cost function.

Figure 2A:
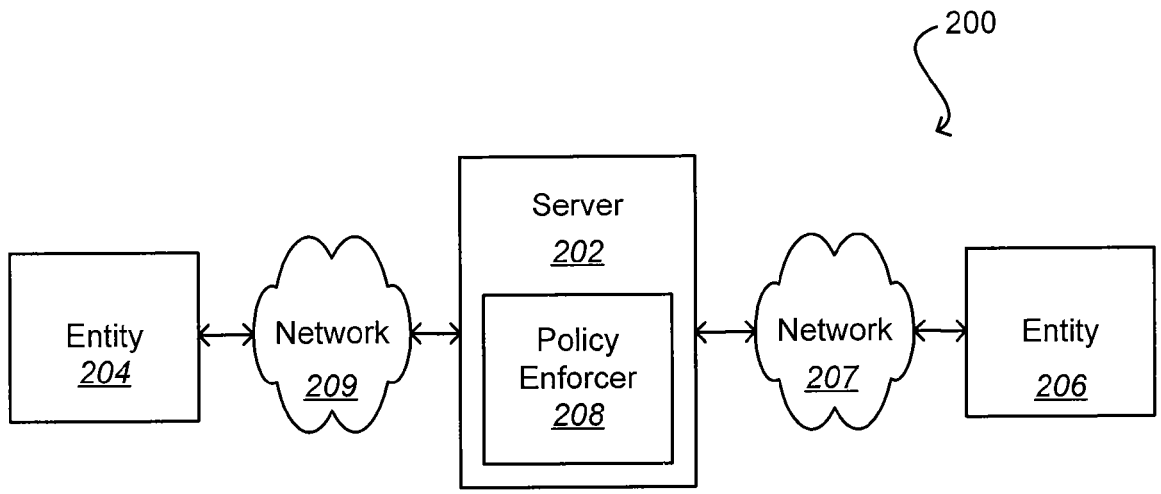
FIGS. 2(a) and 2(b) are block diagrams illustrating components of systems for applying policies to electronic communications in which various embodiments of the present invention may be implemented.
Figure 2B:
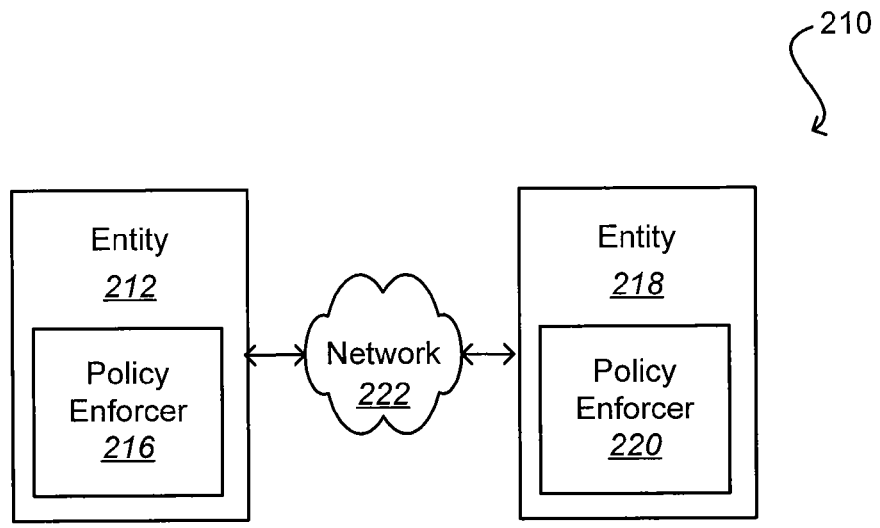

FIGS. 2(*a*) and 2(*b*) depict exemplary systems 200 and 210 for applying policies to electronic communications in which various embodiments of the present invention may be implemented. In the system 200 of FIG. 2(*a*), a communication server 202, a first communication entity 204, and a second communication entity 206 are provided, which communicate through the communication server 202 via one or more networks 207 and 209. It will be understood that any number of entities and/or servers can be used with such a system 200, and methods for allowing the servers to cooperate, including aggregation, replication, and cascading techniques, are known in the art and will not be discussed in detail herein.

In the system 210 of FIG. 2(*b*), a first entity 212 and second entity 218 communicate directly through a peer-to-peer connection via a network 222 as known in the art. Each entity 212, 218 can have a policy enforcer instance 216, 220 as discussed later herein.

The entities 204, 206, 212, 218 in either system 200 or 210 can be capable of sending and receiving communications and/or requests for resources. The entities 204, 206, 212, 218 can be configured to exchange communications with other entities by any appropriate mechanism, such as via the server 202 or peer to peer as known in the art. Additionally or alternatively, the entities 204, 206, 212, 218 can be adapted to request access to one or more resources of the server 202 or other entities. The entities 204, 206, 212, 218 can be run any appropriate computing, processing, or communication device, such as a personal computer, personal digital assistant (PDA), cellular telephone, multimedia phone, etc. They can also be servlets or any other resource.

The server 202 in FIG. 2(*a*) can be any appropriate computing, routing, or processing device configured to route messages, communications, or other information. For example, the communication server 202 can be a server found in a computerized network that is configured to route messages to computerized entities, and can be a computing device that is also running a entity. Further, although a policy enforcer 208 is shown as being found in the server 202, it will be appreciated that the policy enforcer 208 can be included on any device, such as a computer running either of the entity instances 204, 206.

The policy enforcer 208 can be configured to apply policies to any communications between a entity 204, 206 and the server 202 or any request for a resource of the server 202 or other entity. In one embodiment, the policy enforcer can intercept the communication or request, select the appropriate policy for the intercepted communication or request, then enforce the appropriate policy. The policy can include at least one condition and at least one action, and can include a set of conditions and actions. When one or more conditions are satisfied, the corresponding actions may be performed by policy enforcer 208.

In the peer to peer system 210, the policy enforcer can be part of at least one of the entities 212 or 218 in for communication or collaboration. Each policy enforcer 216 and 220 can be configured to apply policies to any incoming and/or outgoing communication for the respective entity.

For example, a policy can be applied when a user is absent and not connected with the device for that user. However, it will be understood that the policy may be applied for any appropriate conditions. Policies can be set to determine any of a number of aspects of various applications including but not limited to messaging or collaboration. For example, a policy can be used for access control (AAA), charging or billing, defining a Service Level Agreement (SLA), defining quality of services, defining priorities, defining preferences, defining privacy/filtering, defining conditions of usage, logging, etc.

As noted above, a policy can be evaluated or enforced in proxy mode, i.e. as gatekeeper to request to use a resource, or in callable mode as a delegated or callable process that can be requested. FIGS. 3(*a*) and 3(*b*) are block diagrams illustrating implementation of policy enforcement/evaluation in different modes according to various embodiments of the present invention. More specifically, FIG. 3*a* illustrates an example of a policy evaluation or enforcement module 305 operating in a proxy mode while FIG. 3*b* illustrates an example of the policy evaluation or enforcement module 305 operating in a callable mode.

Figure 3A:
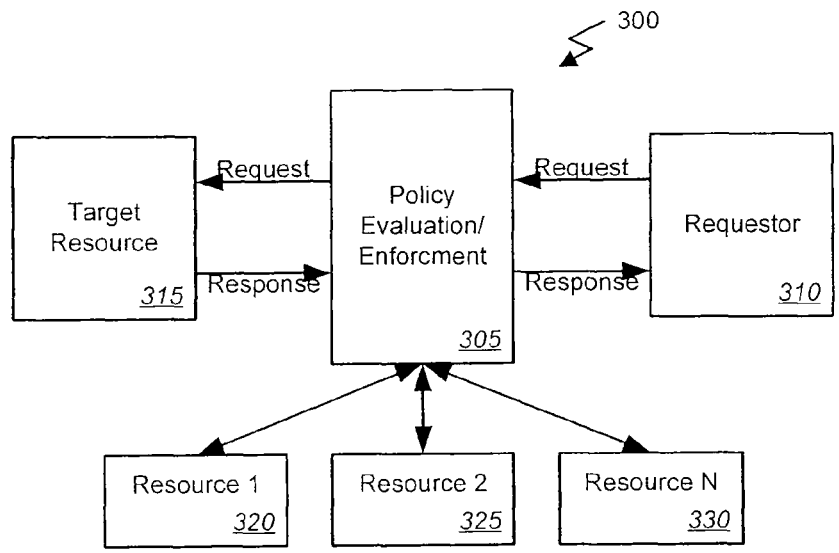
FIGS. 3(a) and 3(b) are block diagrams illustrating implementation of policy enforcement/evaluation in different modes according to various embodiments of the present invention.

In the proxy mode illustrated in FIG. 3*a*, requests for resources 315 from a requestor 310 are intercepted by the policy evaluation or enforcement module 305. Policy evaluation and enforcement can be performed by the policy evaluation or enforcement module 305 based on the request. Policy evaluation and enforcement can also be delegated to a number of delegate resources 320-330. That is policy evaluation and enforcement module 305 can delegate both evaluation and enforcement—e.g., call a workflow that carries processing of conditions and actions to one of the delegate resources 320-330 then terminates, for example, without returning results to the requester (thread terminates or return results/events to another actor). It should be understood that policy optimization as described herein can apply to Open Services Architecture (OSA) orchestrators, composers, workflows, and others.

Figure 3B:
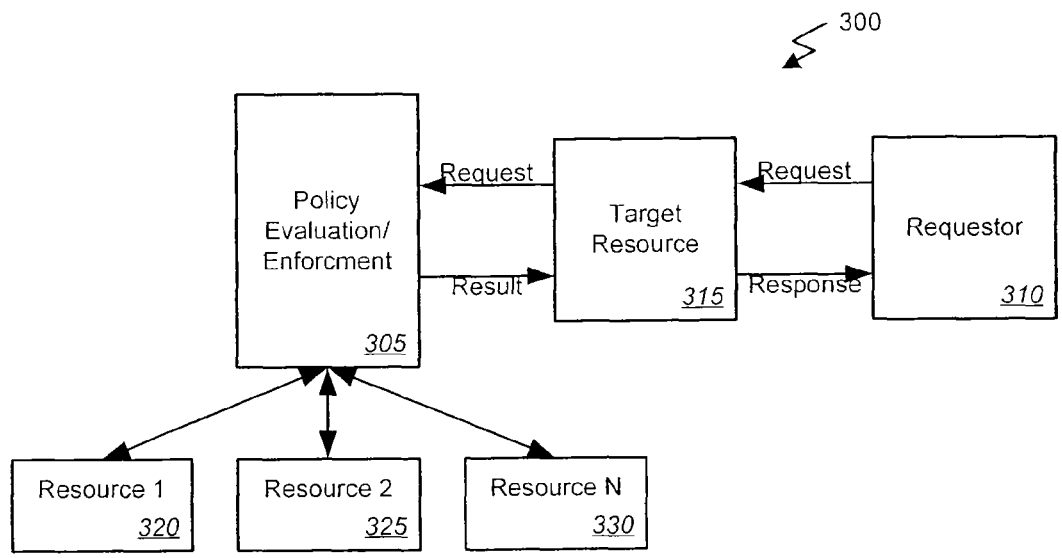

In the callable mode illustrated in FIG. 3b, the requestor 310 makes a request to access a resource 315 which in turn calls the policy evaluation and enforcement module 305 to perform some function based on a policy. For example, the policy evaluation and enforcement module 305 can provide authentication and/or authorization or other services for the resources. In the callable mode, the policy evaluation and enforcement module 305 can also delegate functions to a number of delegate resources 320-330.

As noted above, depending upon where and how the policy enforcer is implemented, a policy optimizer may also me implemented at different locations and/or at different times such as when authoring the policy (i.e. while authoring or after authoring), when storing, before processing the policy or when the policy is being processed, i.e., in real time. As will be discussed in detail below, the policy optimizer can be adapted to improve the efficiency of the policies as defined by a cost function. That is, the cost function can define parameters by which the efficiency of the policy can be judged. The policy can then be organized or modified in a manner to improve the efficiency of the implemented policy in terms of this cost function.

Figure 4:
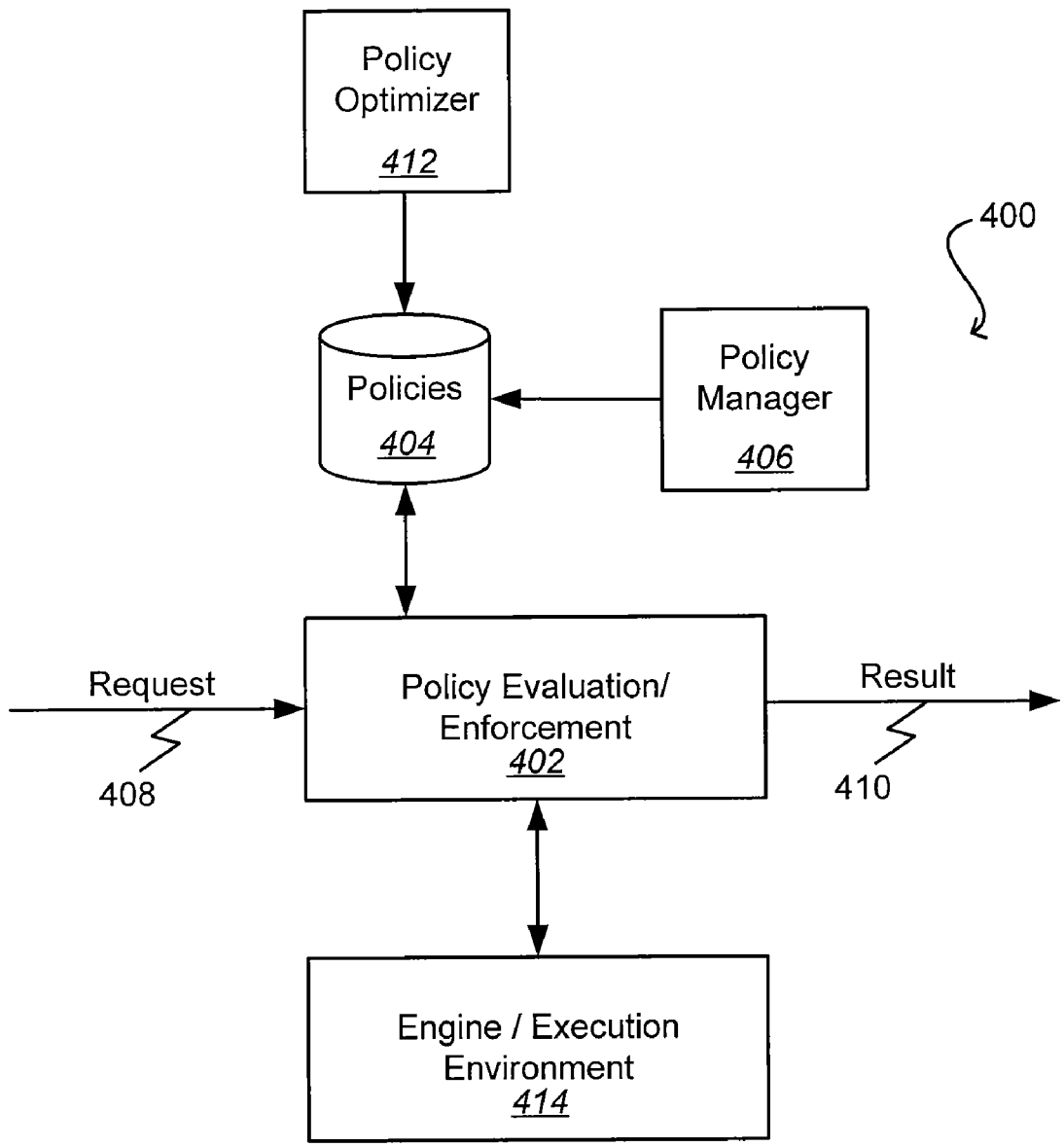
FIG. 4 is a block diagram illustrating components of a policy enforcer according to one embodiment of the present invention.

FIG. 4 is a block diagram illustrating components of a policy enforcer 400 according to one embodiment of the present invention. The policy evaluation and/or enforcement module 402 can be configured to evaluate conditions and/or requests for resources and execute actions in a predetermined policy. In some cases, a policy to be applied can be selected from a plurality of policies. The selection of a policy from a set of policies 404 stored in an accessible location can be part of the evaluation of conditions. Also, a policy manager 406 can be used that allows for the updating, editing, and managing of the various policies 404 by any authorized principal (e.g., an administrator, user or agent).

The policy evaluation and/or enforcement module 402 can decide whether a policy should be applied to a communication or request for a resource. For example, if a policy should be applied, the policy evaluation and/or enforcement module 402 can retrieve or read a policy from a policy store 404. Multiple policies may be stored for multiple users. Or, in other embodiments, one or more standard policies may be applied for more than one user. In some cases, policies may be indexed by users and retrieved based on the recipient for the communication, the requester, or the requested resource. Any other set of conditions to evaluate also can be used. The communication and policy are then processed with other conditions evaluated and actions executed. According to one embodiment, the policy evaluation and/or enforcement module may partially or completely execute or delegate the policy to optimized engines or execution environments 412 like C, C++, Java, Java or other script, other pre coded functions, etc.

The policy evaluation and/or enforcement module 402 can be configured to determine at least one action to take based on the communication or request and the policy. The policy evaluation and/or enforcement module 402 can also determine information to apply to the policy. The policy may be a logical combination of conditions to be satisfied and actions to be executed. Each policy may be composed of multiple policies, which further evaluate conditions and/or perform actions. The policies may be programs, program components, or any other type of machine-executable instructions.

The policy evaluation and/or enforcement module 402 can first determine information that should be applied to the policy. For example, the policy may specify that the recipient, some content of the communication, the status of the recipient or the requester, the resource requested, or any other information should be applied to conditions in the policy.

When the information is run through the policy and conditions are satisfied through a logical combination, one or more actions can be determined. For example, when certain conditions are satisfied, a logical combination leads to one or more actions to be performed.

Many different actions may be performed. For example, a policy can be used for access control (AAA), charging or billing, defining a Service Level Agreement (SLA), defining quality of services, defining priorities, defining preferences, defining privacy/filtering, defining conditions of usage, logging, etc.

As noted above, the policy enforcer can be implemented in a web service gateway. The web service gateway can be further adapted to intercept web service exchanges and apply the policy to the exchanges. Applying the policies to the exchanges can cause the web service gateway to perform authentication and/or authorization services for users of a web service. Additionally or alternatively, applying the policies to the exchanges can cause the web service gateway to charge users for use of a web service.

Policies stored in the policy store 404 may be updated and managed by a user or other entity. For example, a policy manager 406 may be used to dynamically update policies. A user may use a client to specify updates to the policies through the policy manager 406. Also, updates to the policies may be provided through other channels, such as through email, web pages, SMS, etc. Accordingly, users may personalize a policy by specifying various conditions and actions to be performed if the conditions are met. It should be noted that, according to another embodiment, policies need not be stored in optimized form. Rather, policy optimization, as will be discussed below, can be applied at runtime of the policies, i.e., when the policies are applied. However, policies may be optimized and stored in the policy store 404 in advance, like at authoring or deployment/provisioning, in order to reduce latencies and otherwise improve performance.

According to one embodiment, the policy enforcer 400 can also include or be communicatively coupled with a policy optimizer 412. The policy optimizer 412 can be adapted to determine a topology for the policy. That is, the policy optimizer 412 can determine all or some subset of all decision paths that may be taken through the rules of the policy during application of the policy. The policy optimizer 412 can then determine a plurality of equivalent topologies for the policy. That is, by using various techniques known in the art, such as by generating all possible outcomes (e.g. greedy algorithms, genetic algorithms, and others), etc., the policy optimizer 412 can generate a number of topologies that represent various possible flows or decision paths through the policy. The policy optimizer 412 can then apply a cost function to each of the plurality of equivalent topologies, and select one of the plurality of equivalent topologies based on the cost function. According to one embodiment, transformations of the way that the policies are processed, for example by designated hardware modules, other languages, environments, etc., are also examples of equivalent topology transformations. As noted above, policies may be optimizing at runtime or in a batch process performed, for example at authoring or deployment/provisioning. Furthermore, optimization can include delegating execution of the policy or portions thereof to optimized engines, e.g. delegate/implement the policy or portions of the policy via specified hardware, or another language processor.

According to one embodiment, policy optimizer 412 can perform policy optimization based on various graph optimization algorithms by reorganizing the graph e.g., based on algorithms and measures of the graph, via the greedy algorithm that tries all options, heuristic techniques, or the genetic algorithm to pick the best possible configuration. The best possible configuration can be considered the one that has the best criteria based on the cost function.

For example, the policy optimizer 412 can be adapted to apply the cost function to each of the plurality of equivalent topologies by determining an amount of latency in execution of each topology and select an equivalent topology with a least amount of latency. In another example, the policy optimizer 412 can be adapted to apply the cost function to each of the plurality of equivalent topologies by determining a speed of execution for each topology and select the one of the plurality of equivalent topologies with a highest speed. Additionally or alternatively, the policy optimizer 412 can be adapted to apply the cost function to each of the plurality of equivalent topologies by determining a CPU consumption for execution of each topology and select the one of the plurality of equivalent topologies with a lowest CPU consumption. In yet another example, the policy optimizer 412 can be adapted to apply the cost function to each of the plurality of equivalent topologies by determining a level of parallelization for each topology and select the one of the plurality of equivalent topologies with a highest level of parallelization. Alternatively, the policy optimizer 412 can be adapted to apply the cost function to each of the plurality of equivalent topologies by determining a level of parallelization for each topology and select an equivalent topology with a least amount of parallelization. In still another example, the policy optimizer 412 can be adapted to apply the cost function to each of the plurality of equivalent topologies by determining an amount of delegation to external tasks during execution of each topology and select an equivalent topology with a least amount of delegation. Additionally or alternatively, the policy optimizer 412 can be adapted to apply the cost function to each of the plurality of equivalent topologies by determining a level of serialization for each topology and select an equivalent topology with a highest level of serialization. In yet another example, the policy optimizer 412 can be adapted to apply the cost function to each of the plurality of equivalent topologies by determining a level of serialization for each topology and select an equivalent topology with a least amount of serialization. In another case, all or part of a topology may be transformed to other execution languages that can be then combined as described, for example, in the co-pending U.S. patent application Ser. No. 11/565,578 entitled "Orchestration of Policy Engines and Format Technologies" filed on Nov. 30, 2006 by S. Maes. Additionally or alternatively, execution of specific portions of the topology, i.e., subgraphs, can be delegated to other execution environments. Furthermore, combining these environments in some cases can allow optimizing the execution of some subgraphs.

The policy optimizer 412 can be further adapted to store one or more hard-coded, predetermined patterns of possible execution paths for the policy. Alternatively or additionally, such patterns may be realized or implemented in hardware. That is, the hardware may implement a graph or subset of a graph, branch or pattern or may be optimized to process certain topologies. In either case, the policy optimizer 412 can be further adapted to identify one or more of the hard-coded, predetermined patterns in the selected topology. The identified one or more hard-coded, predetermined patters can be precompiled for execution during enforcement of the policy, for example in another execution environment or in hardware. According to one embodiment, the policy optimizer 412 can be adapted to apply the cost function by identifying occurrences of one or more of the hard-coded, predetermined patterns in the plurality of equivalent topologies. That is, the policy optimizer 412 may be adapted to select an equivalent topology based on the presence or occurrence of patterns within the topology that match the hard-coded, predetermined patterns. In such a case, selecting one of the plurality of equivalent topologies based on the cost function can comprise selecting an equivalent topology with a greatest occurrence of hard-coded, predetermined patterns. The identified patterns can then be precompiled for use during application/enforcement of the policy. According to one embodiment, the policy optimizer 412 can be further adapted to rearrange portions of the selected topology not including hard-coded, predetermined patterns to decrease a depth of the topology and/or to increase parallelization of the topology. That is, after precompiling the identified patterns, the policy optimizer 412 can further modify or reorganize the remaining portions of the policy for further optimization.

As noted above, policy optimization can be performed at different times or at different levels. For example, policy optimization can be performed when authoring the policy (i.e. while authoring or after authoring), when storing, before processing the policy or when the policy is being processed, i.e., in real time.

Figure 5:
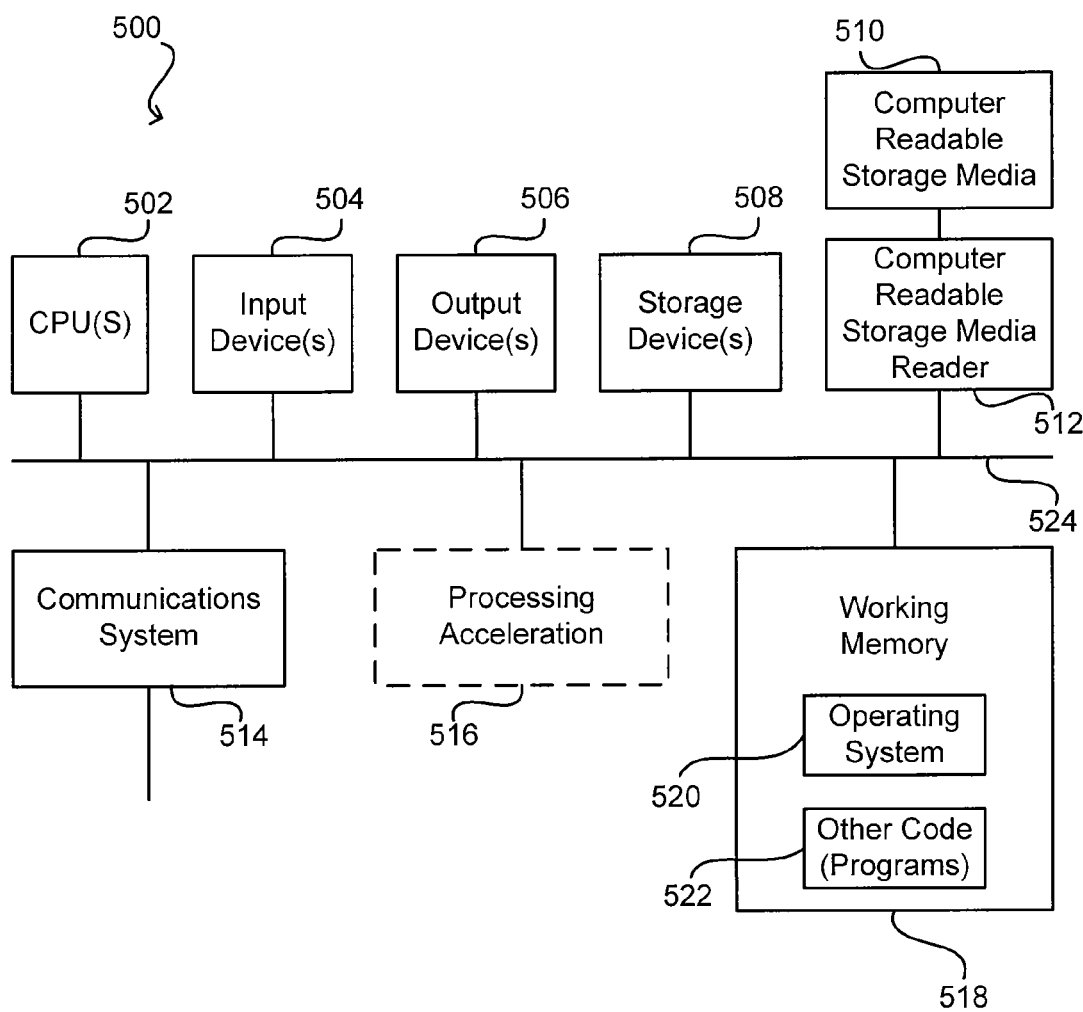
FIG. 5 is a block diagram illustrating an exemplary computer system upon which embodiments of the present invention may be implemented.

FIG. 5 is a block diagram illustrating an exemplary computer system upon which embodiments of the present invention may be implemented. The system 500 may be used to implement any of the computer systems described above. For example, one or more systems such as system 500 may be used to implement a server, user computer, a policy enforcer, a policy optimizer and/or any other of the systems or components described above.

The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Software stored on and/or executed by system 500 can include instructions for improving efficiency during enforcement of a policy. Generally speaking such instructions can cause the system to determine a topology for the policy, determine a plurality of equivalent topologies for the policy, apply a cost function to each of the plurality of equivalent topologies, and select one of the plurality of equivalent topologies based on the cost function.

Figure 6:
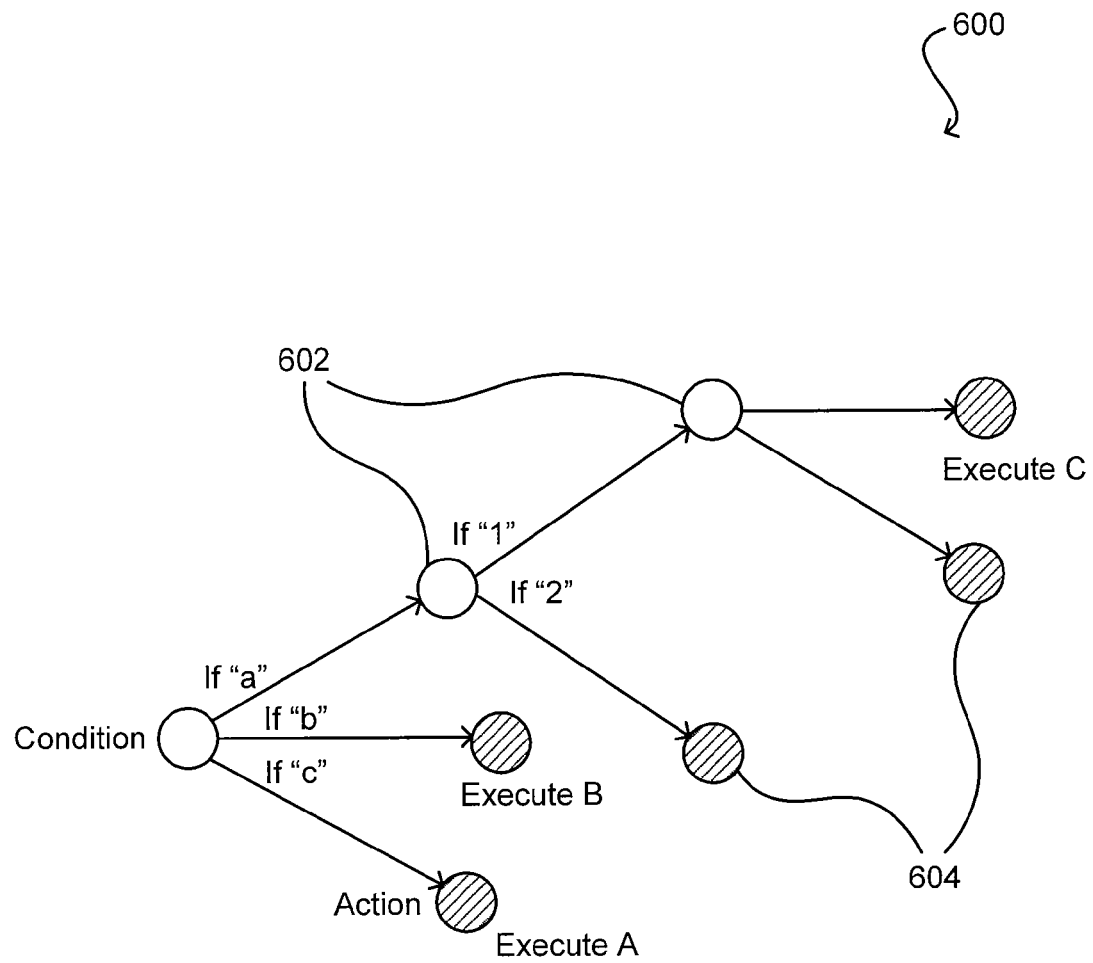
FIG. 6 illustrates the flow of a policy that can be used in accordance with one embodiment of the present invention.

FIG. 6 illustrates the flow of a policy that can be used in accordance with one embodiment of the present invention. As shown, various conditions 602 and actions 604 are provided. The policy can be a simple file that contains a flow of conditions followed by explicit actions. The file can be any appropriate file, such as an XML rule set, BPEL file, a file in any appropriate programming language, or a combination thereof. In the policy, a flow of conditions is followed until the appropriate action to execute is determined. Methods for implementing policies and decision trees are well known in the art and will not be discussed herein in detail.

According to one embodiment, the decision tree representing the policy can be used to generate a number of equivalent decision trees or topologies. For example, as can be understood by one skilled in the art, based on the decision tree/topology and possible outcomes for decisions on the path, another, equivalent topology can be generated based on selecting one or more paths through the decision tree. Furthermore, alternative topologies can be generated based on different decisions/paths. Thus a number of different, equivalent topologies can be determined representing various possible paths through the decision tree. As described above, a cost function can then be applied to these various equivalent topologies to select a topology with a lowest cost, as defined by the cost function.

Figure 7A:
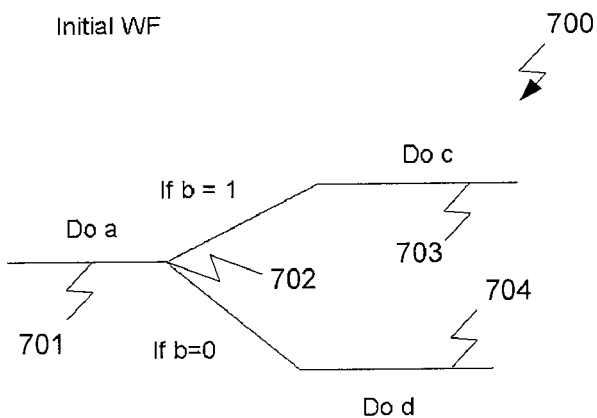
FIGS. 7A-7E illustrates an exemplary topology for a policy and transformations for that topology according to one embodiment of the present invention.

FIGS. 7A-7E illustrates an exemplary topology for a policy and transformations for that topology according to one embodiment of the present invention. It should be understood that these representations are just theoretical examples offered for purposes of illustration only and the many other examples can be considered. More specifically, FIG. 7A illustrates an exemplary, initial topology 700 for a particular policy. This topology 700 represents a number of actions 701, 703, and 704 and conditions 702 which represent possible flows though the policy. For example, when the policy is initiated or triggered, a first action 701 may be performed. A condition 702 can be checked upon completion of the action 701 and additional actions 703 and 704 can be performed based on the result or state of the condition 702.

Figure 7B:
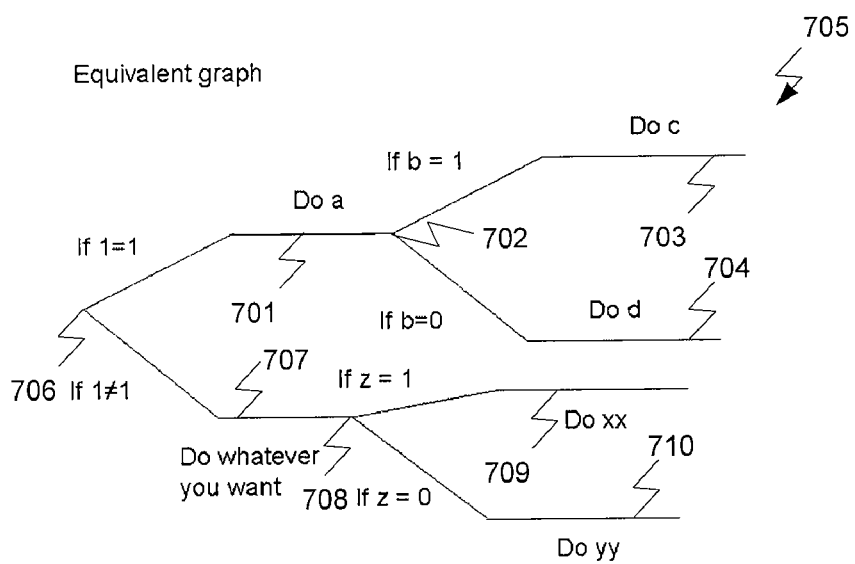

FIG. 7B illustrates one equivalent topology 705 for the initial topology 700. In this case, the equivalent topology 705 has been expanded based on possibly evaluations of the policy. That is, the equivalent topology 7054 includes the original actions 701, 703, and 704 and conditions 702 but has been expanded to include a previous condition 706 and alternative subsequent actions 707, 709, and 710 and conditions 708.

Figure 7C:
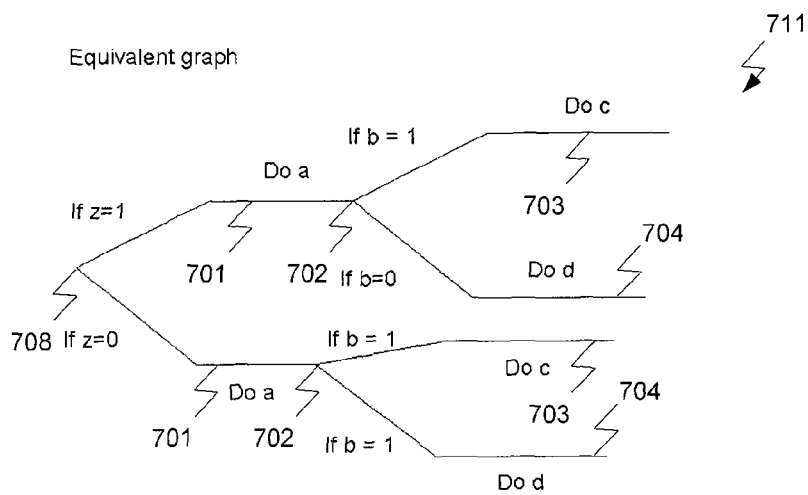

FIG. 7C illustrates an equivalent topology 711 which has been simplified over the topology 705 illustrated in FIG. 7B. In this case, unlikely or unnecessary conditions 706 and actions 707, 709, and 710 have been eliminated. Furthermore, additional conditions and actions are added to represent to represent all possible paths through the policy.

Figure 7D:
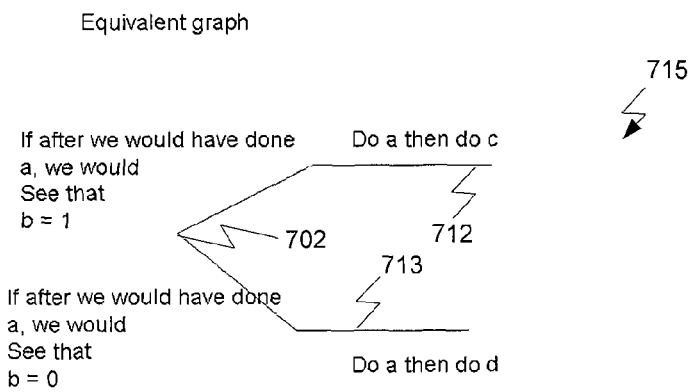
Figure 7E:
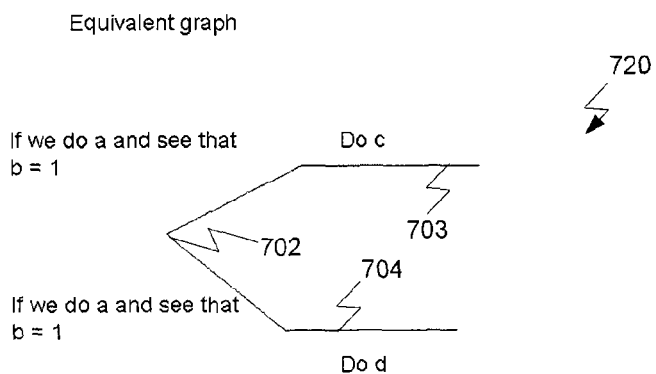

FIG. 7D represents a topology 715 that is a further simplification of the topology 711 of FIG. 7C in which the topology is simplified to a representative condition 702 and resulting actions 712 and 713. Similarly, FIG. 7E represents a topology 720 that is a further simplification of the topology 715 of FIG. 7D in which the topology is simplified to a representative condition 702 and resulting actions 703 and 704.

Figure 8:
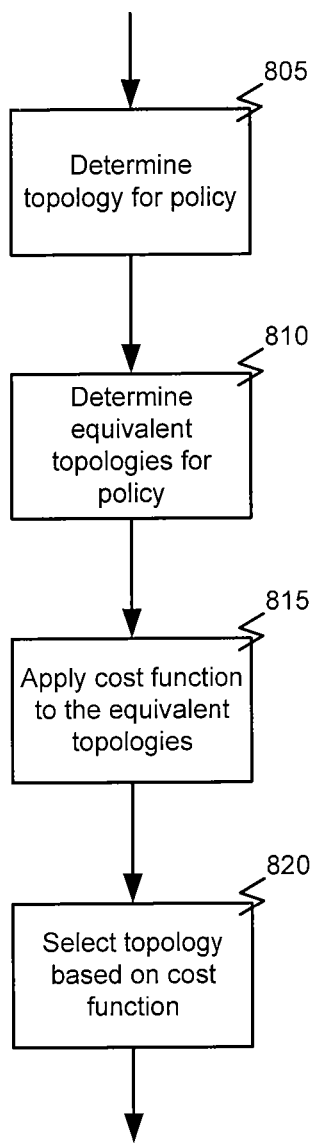
FIG. 8 is a flowchart illustrating a process for improving the efficiency of a policy according to one embodiment of the present invention.

FIG. 8 is a flowchart illustrating a process for improving the efficiency of a policy according to one embodiment of the present invention. As noted above these functions can be performed at different times or at different levels such as when authoring the policy (i.e. while authoring or after authoring), when storing, before processing the policy or when the policy is being processed, i.e., in real time. In this example, processing begins with determining 805 a topology for the policy. That is, the policy can be mapped to a decision tree in a conventional manner as discussed above. A plurality of equivalent topologies for the policy can then be determined 810. In other words, as described above, any of a number of conventional techniques can be used to generate equivalent decision trees/topologies for the policy representing possible paths through the policy. A cost function can be applied 815 to each of the plurality of equivalent topologies and one of the plurality of equivalent topologies can be selected 820 based on the cost function.

Any of a number of possible cost functions, measuring any of a variety of parameters can be applied. For example, applying 815 the cost function to each of the plurality of equivalent topologies can comprise determining an amount of latency in execution of each topology and selecting 820 the one of the plurality of equivalent topologies based on the cost function can comprise selecting an equivalent topology with a least amount of latency. In another example, applying 815 the cost function to each of the plurality of equivalent topologies can comprise determining a speed of execution for each topology and selecting 820 the one of the plurality of equivalent topologies based on the cost function can comprise selecting an equivalent topology with a highest speed. Additionally or alternatively, applying 815 the cost function to each of the plurality of equivalent topologies can comprise determining a CPU consumption for execution of each topology and selecting 820 the one of the plurality of equivalent topologies based on the cost function can comprise selecting an equivalent topology with a lowest CPU consumption. In another example, applying 815 the cost function to each of the plurality of equivalent topologies can comprise determining a level of parallelization for each topology and selecting 820 the one of the plurality of equivalent topologies based on the cost function can comprise selecting an equivalent topology with a highest level of parallelization. In yet another example, applying 815 the cost function to each of the plurality of equivalent topologies can comprise determining a level of parallelization for each topology and selecting 820 the one of the plurality of equivalent topologies based on the cost function can comprise selecting an equivalent topology with a least amount of parallelization. Additionally or alternatively, applying 815 the cost function to each of the plurality of equivalent topologies can comprise determining an amount of delegation to external tasks during execution of each topology and selecting 820 the one of the plurality of equivalent topologies based on the cost function can comprise selecting an equivalent topology with a least amount of delegation. In another example, applying 815 the cost function to each of the plurality of equivalent topologies can comprise determining a level of serialization for each topology and selecting 820 the one of the plurality of equivalent topologies based on the cost function can comprise selecting an equivalent topology with a highest level of serialization. In still another example, applying 815 the cost function to each of the plurality of equivalent topologies can comprise determining a level of serialization for each topology and selecting 820 the one of the plurality of equivalent topologies based on the cost function can comprise selecting an equivalent topology with a least amount of serialization.

Figure 9:
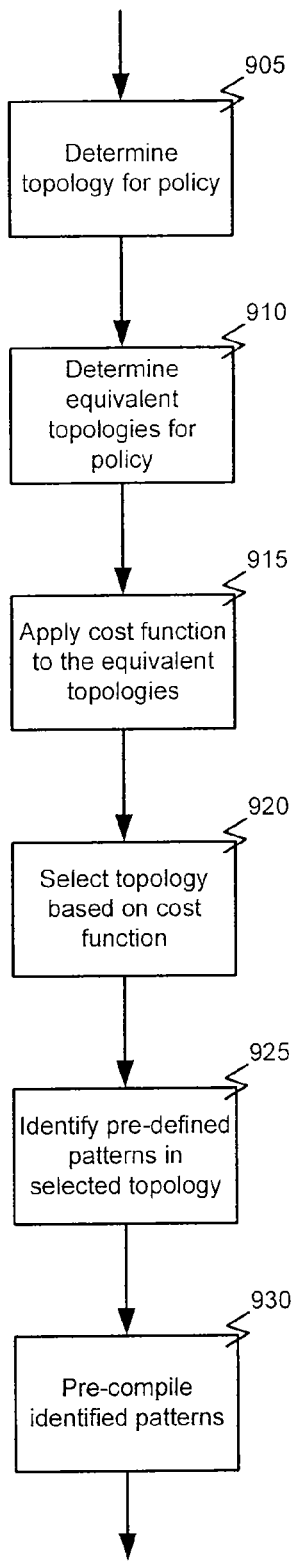
FIG. 9 is a flowchart illustrating additional details of a process for improving the efficiency of a policy according to one embodiment of the present invention.

FIG. 9 is a flowchart illustrating additional details of a process for improving the efficiency of a policy according to one embodiment of the present invention. In this example, processing begins with determining 905 a topology for the policy. That is, the policy can be mapped to a decision tree in a conventional manner as discussed above. A plurality of equivalent topologies for the policy can then be determined 910. In other words, as described above, any of a number of conventional techniques can be used to generate equivalent decision trees/topologies for the policy representing possible paths through the policy. A cost function can be applied 915 to each of the plurality of equivalent topologies and one of the plurality of equivalent topologies can be selected 920 based on the cost function. As noted above, any of a number of possible cost functions, measuring any of a variety of parameters can be applied.

According to one embodiment, one or more of the hard-coded, predetermined patterns can be identified 925 in the selected topology. That is, one or more pre-determined and/or pre-stored patterns, perhaps determined by previous policy evaluations, can be compared to the selected topology to locate the same patterns occurring therein. The identified one or more hard-coded, predetermined patters can be pre-compiled 930 for execution during enforcement of the policy. That is, a number of predetermined patterns or partial execution paths can be saved in hard-coded form. These hard-coded, predetermined patterns, when found in the selected topology, can be precompiled and saved for use during execution/enforcement of the policy. As noted above, identification of the predetermined patterns 925 and/or pre-compilation 930 or execution of the patterns may be performed on dedicate engines or execution environments (e.g. other languages or hardware, etc.).

According to a further embodiment, when using such hard-coded, predetermined patterns, applying the cost function can comprise identifying occurrences of one or more of the hard-coded, predetermined patterns in the plurality of equivalent topologies and selecting one of the plurality of equivalent topologies based on the cost function can comprise selecting an equivalent topology with a greatest occurrence of hard-coded, predetermined patterns. That is, the cost function may, in part or in whole, be based on the presence of the hard-coded, predetermined patterns in the topologies. According to one embodiment, portions of the selected topology not including hard-coded, predetermined patterns can be rearranged to decrease a depth of the topology and/or to increase parallelization of the topology. That is, potions of the selected topology that do not include the hard-coded, predetermined patterns can be rearranged or "optimized."

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for improving efficiency during enforcement of a policy, the method comprising:
    reading the policy from a policy store by a policy optimizer of a service gateway of a communications network;
    determining by the policy optimizer of the service gateway a topology for the policy;
    generating by the policy optimizer of the service gateway a plurality of equivalent topologies for the policy;
    applying by the policy optimizer of the service gateway a cost function to the policy, wherein applying the cost function to the policy comprises applying the cost function to each of the plurality of equivalent topologies;
    optimizing the policy by the policy optimizer of the service gateway based on the cost function wherein optimizing the policy based on the cost function comprises selecting one of the plurality of equivalent topologies based on the cost function; and
    applying by a policy enforcer of the service gateway the selected policy to a message on the communications network.

2. The method of claim 1, wherein applying the cost function to each of the plurality of equivalent topologies comprises determining an amount of latency in execution of each topology and selecting the one of the plurality of equivalent topologies based on the cost function comprises selecting an equivalent topology with a least amount of latency.

3. The method of claim 1, wherein applying the cost function to each of the plurality of equivalent topologies comprises determining a speed of execution for each topology and selecting the one of the plurality of equivalent topologies based on the cost function comprises selecting an equivalent topology with a highest speed.

4. The method of claim 1, wherein applying the cost function to each of the plurality of equivalent topologies comprises determining a CPU consumption for execution of each topology and selecting the one of the plurality of equivalent topologies based on the cost function comprises selecting an equivalent topology with a lowest CPU consumption.

5. The method of claim 1, wherein applying the cost function to each of the plurality of equivalent topologies comprises determining a level of parallelization for each topology and selecting the one of the plurality of equivalent topologies based on the cost function comprises selecting an equivalent topology with a highest level of parallelization.

6. The method of claim 1, wherein applying the cost function to each of the plurality of equivalent topologies comprises determining a level of parallelization for each topology and selecting the one of the plurality of equivalent topologies based on the cost function comprises selecting an equivalent topology with a least amount of parallelization.

7. The method of claim 1, wherein applying the cost function to each of the plurality of equivalent topologies comprises determining an amount of delegation to external tasks during execution of each topology and selecting the one of the plurality of equivalent topologies based on the cost function comprises selecting an equivalent topology with a least amount of delegation.

8. The method of claim 1, wherein applying the cost function to each of the plurality of equivalent topologies comprises determining a level of serialization for each topology and selecting the one of the plurality of equivalent topologies based on the cost function comprises selecting an equivalent topology with a highest level of serialization.

9. The method of claim 1, wherein applying the cost function to each of the plurality of equivalent topologies comprises determining a level of serialization for each topology and selecting the one of the plurality of equivalent topologies based on the cost function comprises selecting an equivalent topology with a least amount of serialization.

10. The method of claim 1, further comprising storing by the policy optimizer of the service gateway one or more hard-coded, predetermined patterns of possible execution paths for the policy.

11. The method of claim 1, further comprising implementing by the policy optimizer of the service gateway one or more equivalent topologies in dedicated hardware.

12. The method of claim 11, wherein optimizing the policy based on the cost function comprises executing the equivalent topologies implemented in hardware based on the cost function.

13. The method of claim 10, further comprising:
identifying by the policy optimizer of the service gateway one or more of the hard-coded, predetermined patterns in the selected topology; and
pre-compiling by the policy optimizer of the service gateway the identified one or more hard-coded, predetermined patters for execution during enforcement of the policy.

14. The method of claim 10, wherein applying the cost function comprises identifying occurrences of one or more of the hard-coded, predetermined patterns in the plurality of equivalent topologies and selecting one of the plurality of equivalent topologies based on the cost function comprises selecting an equivalent topology with a greatest occurrence of hard-coded, predetermined patterns.

15. The method of claim 14, further comprising pre-compiling by the policy optimizer of the service gateway the identified one or more hard-coded, predetermined patters for execution during enforcement of the policy.

16. The method of claim 15, further comprising rearranging by the policy optimizer of the service gateway portions of the selected topology not including hard-coded, predetermined patterns to decrease a depth of the topology.

17. The method of claim 15, further comprising rearranging by the policy optimizer of the service gateway portions of the selected topology not including hard-coded, predetermined patterns to increase parallelization of the topology.

18. The method of claim 1, wherein optimizing the policy based on the cost function is performed during authoring of the policy.

19. The method of claim 1, wherein optimizing the policy based on the cost function is performed before processing of the policy.

20. The method of claim 1, wherein optimizing the policy based on the cost function is performed during processing of the policy.

21. The method of claim 1, wherein optimizing the policy based on the cost function comprises delegating enforcement of at least a portion of the policy to optimized hardware.

22. The method of claim 1, wherein optimizing the policy based on the cost function comprises delegating enforcement of at least a portion of the policy to an optimized execution environment.

23. The method of claim 1, wherein applying the cost function to the policy and optimizing the policy based on the cost function are performed in real time during enforcement of the policy.

24. The method of claim 1, wherein applying the cost function to the policy and optimizing the policy based on the cost function are performed during authoring of the policy.

25. The method of claim 1, wherein applying the cost function to the policy and optimizing the policy based on the cost function are performed during deployment of the policy.

26. The method of claim 1, wherein the policy comprises Open System Architecture (OSA) orchestration.

27. The method of claim 1, wherein the policy comprises a workflow.

28. The method of claim 1, wherein the policy comprises a composer.

29. A system comprising:
a communications network;
a policy data store having stored therein a policy, the policy comprising a plurality of rules, each rule comprising at least one condition and at least one action associated with each condition; and
a service gateway coupled with the communications network and the policy data store, the service gateway executing a policy optimizer adapted to read the policy from the policy store, determine a topology for the policy, determine a plurality of equivalent topologies for the policy, apply a cost function to each of the plurality of equivalent topologies, and select one of the plurality of equivalent topologies based on the cost function and a policy enforcer adapted to apply the selected policy to communications on the communications network.

30. The system of claim 29, wherein the policy optimizer is adapted to apply the cost function to each of the plurality of equivalent topologies by determining an amount of latency in execution of each topology and selecting the one of the plurality of equivalent topologies based on the cost function comprises selecting an equivalent topology with a least amount of latency.

31. The system of claim 29, wherein the policy optimizer is adapted to apply the cost function to each of the plurality of equivalent topologies by determining a speed of execution for each topology and selecting the one of the plurality of equivalent topologies based on the cost function comprises selecting an equivalent topology with a highest speed.

32. The system of claim 29, wherein the policy optimizer is adapted to apply the cost function to each of the plurality of equivalent topologies by determining a CPU consumption for execution of each topology and selecting the one of the plurality of equivalent topologies based on the cost function comprises selecting an equivalent topology with a lowest CPU consumption.

33. The system of claim 29, wherein the policy optimizer is adapted to apply the cost function to each of the plurality of equivalent topologies by determining a level of parallelization for each topology and selecting the one of the plurality of equivalent topologies based on the cost function comprises selecting an equivalent topology with a highest level of parallelization.

34. The system of claim 29, wherein the policy optimizer is adapted to apply the cost function to each of the plurality of equivalent topologies by determining a level of parallelization for each topology and selecting the one of the plurality of equivalent topologies based on the cost function comprises selecting an equivalent topology with a least amount of parallelization.

35. The system of claim 29, wherein the policy optimizer is adapted to apply the cost function to each of the plurality of equivalent topologies by determining an amount of delegation to external tasks during execution of each topology and selecting the one of the plurality of equivalent topologies based on the cost function comprises selecting an equivalent topology with a least amount of delegation.

36. The system of claim 29, wherein the policy optimizer is adapted to apply the cost function to each of the plurality of equivalent topologies by determining a level of serialization for each topology and selecting the one of the plurality of equivalent topologies based on the cost function comprises selecting an equivalent topology with a highest level of serialization.

37. The system of claim 29, wherein the policy optimizer is adapted to apply the cost function to each of the plurality of equivalent topologies by determining a level of serialization for each topology and selecting the one of the plurality of equivalent topologies based on the cost function comprises selecting an equivalent topology with a least amount of serialization.

38. The system of claim 29, wherein the policy optimizer is further adapted to store one or more hard-coded, predetermined patterns of possible execution paths for the policy.

39. The system of claim 38, wherein the policy optimizer is further adapted to:
   identify one or more of the hard-coded, predetermined patterns in the selected topology; and
   pre-compile the identified one or more hard-coded, predetermined patters for execution during enforcement of the policy.

40. The system of claim 38, wherein the policy optimizer is adapted to apply the cost function by identifying occurrences of one or more of the hard-coded, predetermined patterns in the plurality of equivalent topologies and selecting one of the plurality of equivalent topologies based on the cost function comprises selecting an equivalent topology with a greatest occurrence of hard-coded, predetermined patterns.

41. The system of claim 40, wherein the policy optimizer is further adapted to pre-compile the identified one or more hard-coded, predetermined patters for execution during enforcement of the policy.

42. The system of claim 41, wherein the policy optimizer is further adapted to rearrange portions of the selected topology not including hard-coded, predetermined patterns to decrease a depth of the topology.

43. The system of claim 41, wherein the policy optimizer is further adapted to rearrange portions of the selected topology not including hard-coded, predetermined patterns to increase parallelization of the topology.

44. The system of claim 29, wherein the policy enforcer is implemented in a web service gateway.

45. The system of claim 44, wherein the policy optimizer is implemented in the web service gateway.

* * * * *

UNITED STATES PATENT AND TRADEMARK OFFICE
CERTIFICATE OF CORRECTION

Page 1 of 2

PATENT NO. : 8,196,125 B2
APPLICATION NO. : 11/677281
DATED : June 5, 2012
INVENTOR(S) : Maes It is certified that error appears in the above-identified patent and that said Letters Patent is hereby corrected as shown below:

In the Drawings

On sheet 3 of 10, in figure 3(a), Under Reference Numeral 305, line 3, delete "Enforcment" and insert -- Enforcement --, therefor.

On sheet 3 of 10, in figure 3(b), Under Reference Numeral 305, line 3, delete "Enforcment" and insert -- Enforcement --, therefor.

In the Specification

In column 2, line 37, delete "patters" and insert -- patterns --, therefor.

In column 3, line 2-3, delete "network" and insert -- network. --, therefor.

In column 3, line 58, delete "patters" and insert -- patterns --, therefor.

In column 6, line 18, delete "LNIX-like" and insert -- UNIX-like --, therefor.

In column 7, line 39, delete "also me" and insert -- also be --, therefor.

In column 9, line 17, delete "also me" and insert -- also be --, therefor.

In column 12, line 1, delete "patters" and insert -- patterns --, therefor.

In column 15, line 60, delete "patters" and insert -- patterns --, therefor.

Signed and Sealed this
Twenty-second Day of September, 2015

Michelle K. Lee
*Director of the United States Patent and Trademark Office*

CERTIFICATE OF CORRECTION (continued)
U.S. Pat. No. 8,196,125 B2

In the Claims

In column 17, line 66, in claim 13, delete "patters" and insert -- patterns --, therefor.

In column 18, line 10, in claim 15, delete "patters" and insert -- patterns --, therefor.

In column 20, line 19, in claim 39, delete "patters" and insert -- patterns --, therefor.

In column 20, line 30, in claim 41, delete "patters" and insert -- patterns --, therefor.